(12) United States Patent
Lin et al.

(10) Patent No.: US 9,013,580 B2
(45) Date of Patent: Apr. 21, 2015

(54) METHOD AND SYSTEM FOR ADJUSTING DISPLAY PARAMETERS

(71) Applicant: Wistron Corporation, New Taipei (TW)

(72) Inventors: Ching-Nan Lin, New Taipei (TW);
Chia-Yi Chen, New Taipei (TW);
Chun-Yi Wu, New Taipei (TW);
Kuo-Ting Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/089,775

(22) Filed: Nov. 26, 2013

(65) Prior Publication Data

US 2014/0307105 A1    Oct. 16, 2014

(30) Foreign Application Priority Data

Apr. 16, 2013   (TW) .............................. 102113484 A

(51) Int. Cl.
*H04N 9/73* (2006.01)
*H04N 9/69* (2006.01)

(52) U.S. Cl.
CPC ... *H04N 9/73* (2013.01); *H04N 9/69* (2013.01)

(58) Field of Classification Search
USPC .................................................. 348/177–194
See application file for complete search history.

(56) References Cited

U.S. PATENT DOCUMENTS

| 8,094,166 B2 | 1/2012 | Shyu et al. | |
| 2003/0030754 A1* | 2/2003 | Tsukada | 348/649 |
| 2003/0193564 A1* | 10/2003 | Jenkins | 348/182 |

* cited by examiner

*Primary Examiner* — Jefferey Harold
*Assistant Examiner* — Michael Teitelbaum
(74) *Attorney, Agent, or Firm* — Jianq Chyun IP Office

(57) ABSTRACT

A method and a system for adjusting display parameters are provided. In the method, at least one real display parameter of a display to be adjusted is measured. A target template in accordance with the at least one real display parameter is searched from a plurality of templates stored in a database and target parameter adjusting data recorded in the searched target template is obtained, in which each template in the database records the at least one reference display parameter of a tested display and the reference parameter adjusting data used to adjust the tested display. Finally, the display is set and adjusted according to the obtained target parameter adjusting data.

16 Claims, 4 Drawing Sheets

METHOD AND SYSTEM FOR ADJUSTING DISPLAY PARAMETERS

CROSS-REFERENCE TO RELATED APPLICATION

This application claims the priority benefit of Taiwan application serial no. 102113484, filed on Apr. 16, 2013. The entirety of the above-mentioned patent application is hereby incorporated by reference herein and made a part of this specification.

BACKGROUND

1. Technical Field

The invention relates to a display method and a display system. Particularly, the invention relates to a method and a system for adjusting display parameters.

2. Related Art

Before televisions are delivered to customers, adjustment of display parameters such as gamma and white balance (WB) has to be performed on the televisions to comply with customer's specifications. FIG. 1 is a conventional adjusting structure of display parameters. Referring to FIG. 1, the conventional adjusting structure 10 is to execute adjusting software of gamma and white balance on a computer 12. The computer 12 is connected to a television 16 to be tested through a tool board 14, so as to write adjusting data of gamma and white balance into the television 16 through the tool board 14, and display images on the television 16. The computer 12 is further connected to a color analyzer 18, and the color analyzer 18 can be used to measure the display parameters such as gamma, chroma of images displayed on the television 16, and the adjusting software executes a corresponding adjustment procedure of the display parameters.

FIG. 2 is a conventional adjustment procedure of display parameters. Referring to FIG. 1 and FIG. 2, in the conventional adjustment procedure, the adjusting software on the computer 12 first executes initialization on a gamma and white balance adjusting condition (step S202). That is, the adjusting software sets the television to a condition suitable for adjusting gamma and white balance, for example, to turn off a light sensor of the television to avoid an external light source from influencing the light sensor to change a luminance of the image, etc. Then, the adjusting software executes a gamma adjustment and verification procedure (step S204). That is, the adjusting software measures chroma and gamma of the image displayed on the television 16 by using the color analyzer 18, and verifies whether the measured chroma and gamma are in accordance with the customer's specifications, and if not, the television 16 is adjusted according to the chroma and gamma and a recursive verification is performed until the chroma and gamma are in accordance with the customer's specifications. Finally, the adjusting software executes a white balance adjustment and verification procedure (step S206), by which the adjusting software also measures gamma and chroma of the image displayed on the television 16 by using the color analyzer 18, and verifies whether the measured gamma and chroma are in accordance with the customer's specifications on the white balance, and if not, the television 16 is adjusted according to the chroma and gamma and a recursive verification is performed until the gamma and chroma are in accordance with the customer's specifications.

The aforementioned adjustment and verification procedures are repeated on each of the televisions to be delivered, which consumes a lot of time, and does not meet today's high demand on production efficiency.

SUMMARY

The invention is directed to a method and a system for adjusting display parameters, in which by automatically learning an adjustment behavior of gamma and white balance, suitable adjustment parameters are selected to adjust the display, so as to shorten a time required for adjusting the display parameters.

The invention provides a method for adjusting display parameters. In the method, at least one real display parameter of a display to be adjusted is measured. A target template in accordance with the at least one real display parameter is searched from a plurality of templates stored in a database, and target parameter adjusting data recorded in the searched target template is obtained, in which each template records at least one reference display parameter of a tested display and reference parameter adjusting data used to adjust the tested display. Finally, the display is set and adjusted according to the obtained target parameter adjusting data.

In an embodiment of the invention, the at least one real display parameter includes chroma, and the step of searching the target template in accordance with the at least one real display parameter from the database includes following steps. A chroma difference between the measured chroma and a reference chroma recorded in each of the templates is calculated, and the template with the minimum chroma difference is selected to serve as the target template in accordance with the at least one real display parameter.

In an embodiment of the invention, the at least one real display parameter comprises luminance, and before the step of selecting the template with the minimum chroma difference to serve as the target template in accordance with the at least one real display parameter, the method further includes following steps. A luminance difference between the measured luminance and a reference luminance recorded in each of the templates is calculated, and it is determined whether the chroma difference and the luminance difference are respectively smaller than a first predetermined value and a second predetermined value. When the chroma difference and the luminance difference are respectively smaller than the first predetermined value and the second predetermined value, the template with the minimum chroma difference is selected to serve as the target template in accordance with the at least one real display parameter.

In an embodiment of the invention, the at least one real display parameter includes chroma under a high value mode and a low value mode, and the step of searching the target template in accordance with the at least one real display parameter from the database includes following steps. A first chroma difference between the chroma measured under the high value mode and a reference chroma recorded in each of the templates is calculated, and a second chroma difference between the chroma measured under the low value mode and the reference chroma recorded in each of the templates is calculated, and the template with the minimum summation of the first chroma difference and the second chroma difference is selected to serve as the target template in accordance with the at least one real display parameter.

In an embodiment of the invention, before the step of selecting the template with the minimum summation of the first chroma difference and the second chroma difference to serve as the target template in accordance with the at least one real display parameter, the method further determines whether the first chroma difference under the high value mode and the second chroma difference under the low value mode are respectively smaller than a first predetermined value and a second predetermined value. When the first chroma difference and the second chroma difference are respectively smaller than the first predetermined value and the second predetermined value, the template with the minimum summation of the first chroma difference and the second chroma difference is selected to serve as the target template in accordance with the at least one real display parameter.

In an embodiment of the invention, the step of searching the target template in accordance with the at least one real display parameter from the database to obtain the target parameter adjusting data corresponding to the template includes executing a standard parameter adjusting procedure to the display if the target template in accordance with the at least one real display parameter is not searched out.

In an embodiment of the invention, after the step of executing the standard parameter adjusting procedure to the display, the method further creates the template corresponding to the display in the database, and records the at least one real display parameter and the target parameter adjusting data obtained by executing the standard parameter adjusting procedure in the created template.

In an embodiment of the invention, after the step of adjusting the at least one real display parameter of the display, the method further measures the at least one real display parameter of the adjusted display and determines whether the at least one real display parameter is in accordance with a predetermined specification, and if not, a standard parameter adjusting procedure is executed to the display.

In an embodiment of the invention, after the step of executing the standard parameter adjusting procedure to the display, the method further creates the template corresponding to the display in the database, and records the at least one real display parameter and the target parameter adjusting data obtained by executing the standard parameter adjusting procedure in the created template.

In an embodiment of the invention, the step of measuring whether the at least one real display parameter of the adjusted display is in accordance with the predetermined specification so as to execute the standard parameter adjusting procedure to the display includes following steps. Luminance and chroma of the adjusted display are first measured. It is determined whether the measured luminance and the measured chroma are respectively in accordance with a first predetermined range and a second predetermined range. When the measured luminance is not in accordance with the first predetermined range or the measured chroma is not in accordance with the second predetermined range, the standard parameter adjusting procedure is executed to the display.

The invention provides a display parameter adjusting system including a display, a measuring device, a processing device and an adjusting device. The measuring device is used to measure at least one real display parameter of the display. The processing device is coupled to the measuring device and includes a storage unit and a processing unit. The storage unit stores a database containing a plurality of templates, and each of the templates records at least one reference display parameter of a tested display and reference parameter adjusting data used to adjust the tested display. The processing unit is configured to search a target template in accordance with the at least one real display parameter measured by the measuring device from the templates in the database, and obtain target parameter adjusting data recorded in the target template. The adjusting device is coupled to the display and the processing device, and adjusts the display according to the target parameter adjusting data obtained by the processing device.

In an embodiment of the invention, the at least one real display parameter includes chroma, and the processing unit calculates a chroma difference between the measured chroma and a reference chroma recorded in each of the templates, and selects the template with the minimum chroma difference to serve as the target template in accordance with the at least one real display parameter.

In an embodiment of the invention, the processing unit further calculates a luminance difference between the measured luminance and a reference luminance recorded in each of the templates, and determines whether the chroma difference and the luminance difference are respectively smaller than a first predetermined value and a second predetermined value, and selects the template with the minimum chroma difference to serve as the target template in accordance with the at least one real display parameter when the chroma difference and the luminance difference are respectively smaller than the first predetermined value and the second predetermined value.

In an embodiment of the invention, the at least one real display parameter includes chroma and luminance under a high value mode and a low value mode, and the processing unit calculates a first chroma difference between the chroma measured under the high value mode and a reference chroma recorded in each of the templates and a second chroma difference between the chroma measured under the low value mode and the chroma recorded in each of the templates, and selects the template with the minimum summation of the first chroma difference and the second chroma difference to serve as the target template in accordance with the at least one real display parameter.

In an embodiment of the invention, the processing unit further determines whether the first chroma difference under the high value mode and the second chroma difference under the low value mode are respectively smaller than a first predetermined value and a second predetermined value, and selects the template with the minimum summation of the first chroma difference and the second chroma difference to serve as the target template in accordance with the at least one real display parameter when the first chroma difference and the second chroma difference are respectively smaller than the first predetermined value and the second predetermined value.

In an embodiment of the invention, the processing unit controls the adjusting device and the measuring device to execute a standard parameter adjusting procedure to the display if the target template in accordance with the at least one real display parameter is not searched out.

In an embodiment of the invention, after the processing unit executes the standard parameter adjusting procedure to the display, the processing unit creates the template corresponding to the display in the database, and records the at least one real display parameter and the target parameter adjusting data obtained by executing the standard parameter adjusting procedure in the created template.

In an embodiment of the invention, after adjusting the at least one real display parameter of the display, the processing unit further controls the measuring device to measure the at least one real display parameter of the adjusted display, and determines whether the at least one real display parameter is in accordance with a predetermined specification, and if not, the processing unit controls the adjusting device and the measuring device to execute a standard parameter adjusting procedure to the display.

In an embodiment of the invention, after executing the standard parameter adjusting procedure to the display, the processing unit further creates the template corresponding to the display in the database, and records the at least one real display parameter and the target parameter adjusting data obtained by executing the standard parameter adjusting procedure in the created template.

In an embodiment of the invention, the measuring device measures luminance and chroma of the adjusted display, and the processing unit determines whether the measured luminance and the measured chroma are respectively in accordance with a first predetermined range and a second predetermined range, and executes the standard parameter adjusting procedure to the display when the measured luminance is not in accordance with the first predetermined range or the measured chroma is not in accordance with the second predetermined range.

According to the above descriptions, in the method and system for adjusting display parameters, by creating a database and recording a plurality of characteristics and adjusting data of tested displays in the database, when an adjusting procedure of the display with similar characteristic is executed, the previously learned adjusting parameter can be directly used, so as to reduce the time required for adjusting the display parameters.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Based on experiment, it is discovered that when panel characteristics of displays such as gamma or white balance are similar, adjusting data of gamma or white balance is also similar. Therefore, after such adjusting data is applied to displays with similar panel characteristics, through measurement of a color analyzer, most of display parameters of images displayed on the displays can meet specifications. Therefore, in the invention, the original gamma and white balance adjusting mechanism is ameliorated to provide a learning type gamma and white balance adjusting mechanism.

Figure 3:
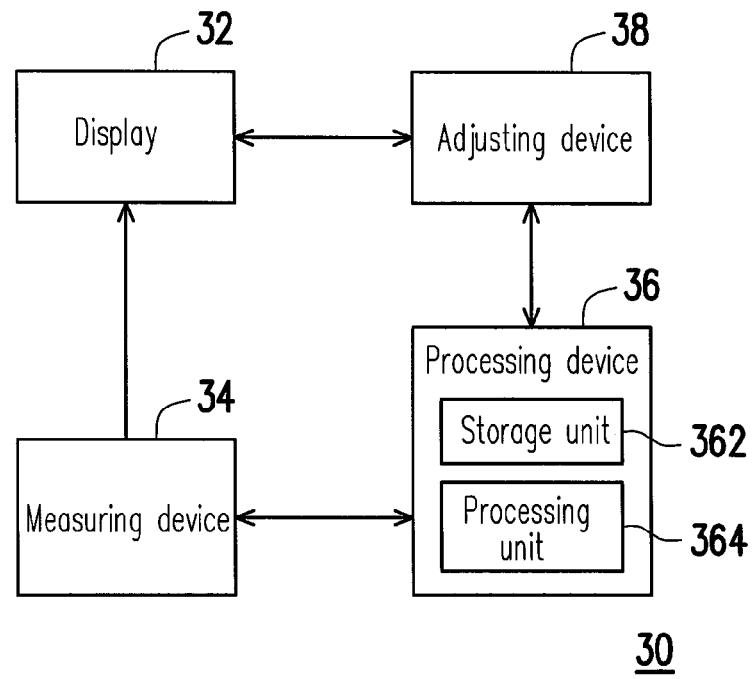
FIG. 3 is a block diagram of a display parameter adjusting system according to an embodiment of the invention.

FIG. 3 is a block diagram of a display parameter adjusting system according to an embodiment of the invention. Referring to FIG. 3, the display parameter adjusting system 30 includes a display 32, a measuring device 34, a processing device 36 and an adjusting device 38, and functions thereof are respectively described below.

The display 32 is, for example, a liquid crystal display (LCD), a light-emitting diode (LED) panel, a field emission display (FED) or a screen or a television of other types of panel, which can receive display signals from external to display images.

The measuring device 34 is, for example, a color analyzer 34, which is adapted to analyze display parameters of luminance, chroma, etc. of an image displayed by the display 32, and provide the same to testers or facilitate the processing device 36 using the same to adjust the display parameters of the display 32.

The processing device 36 is coupled to the measuring device 34 and the adjusting device 38, and includes a storage unit 362 and a processing unit 364. The storage unit 362 is, for example, a storage medium such as a hard disk, a solid state disk (SSD) or a memory which can be used to store a database recording parameter adjusting data. In detail, the data base stores a plurality of templates, and each of the templates records reference display parameters of a different tested display and reference parameter adjusting data used to adjust the display parameters of the tested display. The reference display parameters of the display includes gamma-related panel characteristic parameters and white balance-related panel characteristic parameters, and these parameters are, for example, composed of luminance and chroma parameters, and the processing unit 364 can use the same to implement real-time searching when performing gamma and white balance adjustment.

The processing unit 364 is, for example, a central processing unit (CPU), or a programmable general-purpose or special-purpose microprocessor, a digital signal processor (DSP), a programmable controller, an application specific integrated circuit (ASIC), a programmable logic device (PLD) or other similar devices, which can be used to execute display parameter adjusting steps of the invention.

Figure 4:
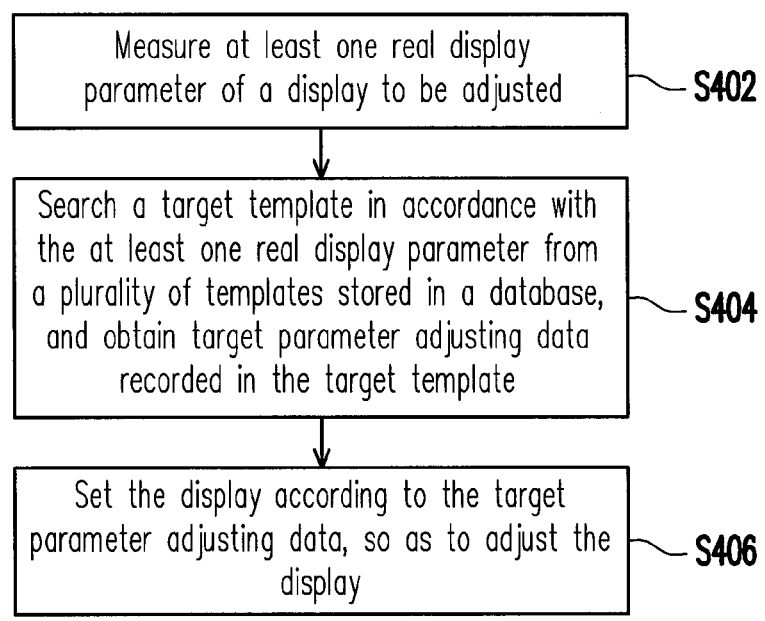
FIG. 4 is a flowchart illustrating a method for adjusting display parameters according to an embodiment of the invention.

In detail, FIG. 4 is a flowchart illustrating a method for adjusting display parameters according to an embodiment of the invention. Referring to FIG. 3 and FIG. 4, the method of the present embodiment is adapted to the display parameter adjusting system 30 of FIG. 3, and detailed steps of the method for adjusting display parameters of the invention are described below with reference to various components of the display parameter adjusting system 30.

First, the measuring device 34 measures at least one real display parameter of the display 32 (step S402). The measured real display parameters, for example, include chroma coordinates of red (R), green (G) and blue (B), or includes luminance (Lv) coordinates and chroma (u', v') coordinates. In an embodiment, regarding a high value mode and a low value mode under a white balance setting, the measured display parameters may further include luminance and/or chroma coordinates under the high value mode and the low value mode, which is not limited by the invention.

The real display parameters measured by the measuring device 34 are input to the adjusting device 36, and the processing unit 364 of the adjusting device 36 searches the database in the storage unit 362 to find a target template in accordance with the measured real display parameters, and obtains target parameter adjusting data corresponding to the target template (step S404). The processing unit 364, for example, compares the real display parameters measured by the measuring device 34 with reference display parameters corresponding to each of the templates, and calculates a difference there between, so as to find a template with the minimum difference from the templates to serve as a basis for adjusting the display.

Finally, the processing unit 364 controls the adjusting device 38 to set the display 32 to adjust the display parameters of the display 32 according to the obtained target parameter adjusting data (step S406). If the processing unit 364 obtains the parameter adjusting data of an optimal template from the database, the processing unit 364 can set the parameter adjusting data to the display 32 through the adjusting device 38, so as to adjust the display 32.

According to the aforementioned adjusting method, in case that the real display parameters of the display are similar to the reference display parameters of the template in the database, the reference parameter adjusting data of the tested template can be directly applied to the display, so as to shorten the time required for adjusting the display parameters of the display. It should be noticed that the invention provides corresponding methods for adjusting the display parameters of gamma and white balance, which are described in detail below.

Figure 5:
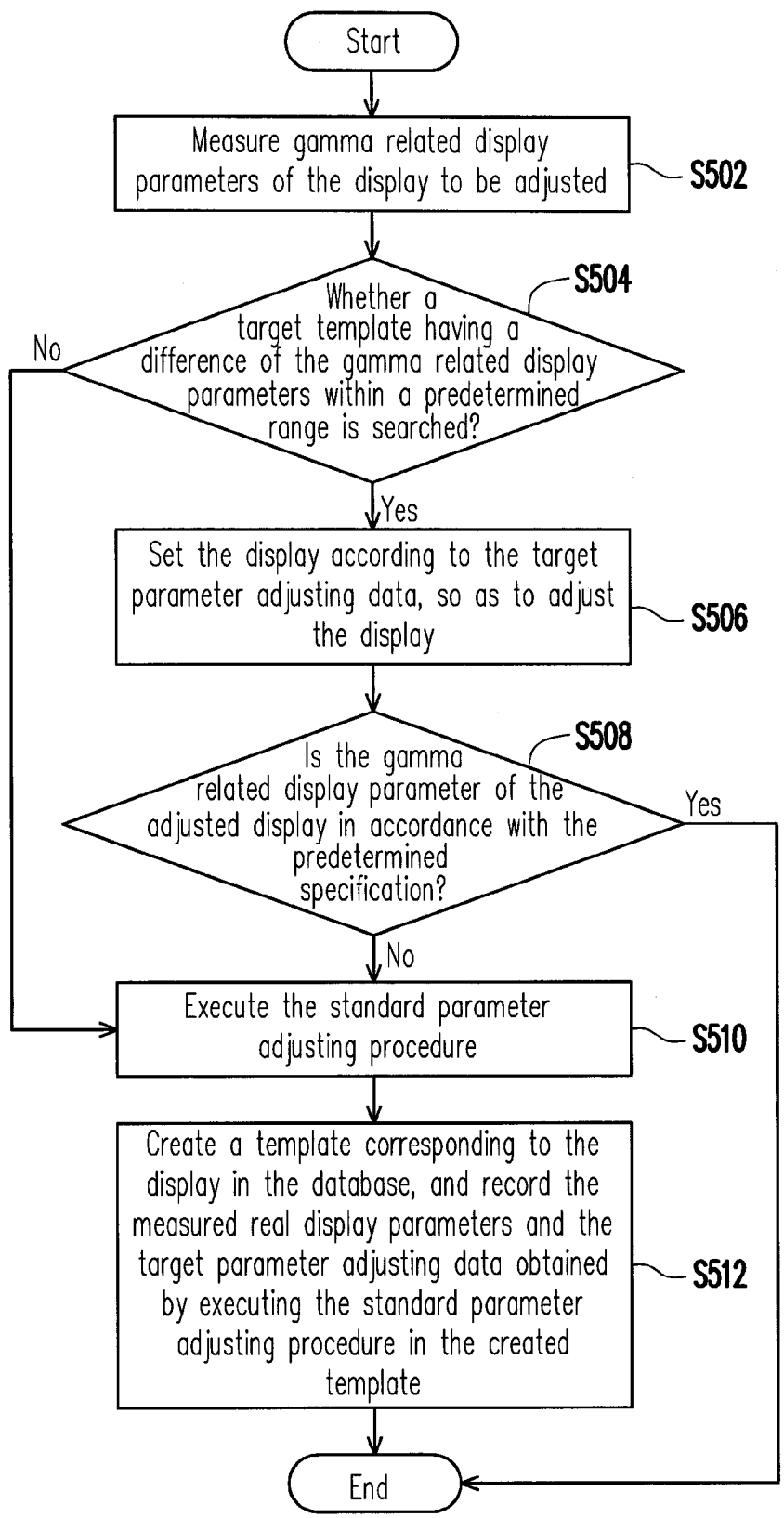
FIG. 5 is a flowchart illustrating a learning type gamma adjusting method according to an embodiment of the invention.

Regarding gamma adjustment, FIG. 5 is a flowchart illustrating a learning type gamma adjusting method according to an embodiment of the invention. Referring to FIG. 3 and FIG. 5, the method of the present embodiment is adapted to the display parameter adjusting system 30 of FIG. 3, and detailed steps of the gamma adjusting method of the invention are described below with reference to various components of the display parameter adjusting system 30.

First, the measuring device 34 measures a gamma related display parameter of the display 32 (step S502). The measured display parameter includes luminance (Lv) coordinates and chroma (u', v') coordinates.

Then, the processing unit 364 of the processing device 36 searches a target template from a plurality of templates in the database, where a difference between a reference display parameter of the target template and the gamma related display parameter is within a predetermined range (step S504). Regarding a method of searching the target template, in the present embodiment, a difference between the measured gamma related display parameter and a reference gamma related display parameter recorded in each template is calculated, and it is determined whether the difference is within a certain predetermined range or ratio, so as to find the proper template.

In the present embodiment, the processing unit 364, for example, first searches the template with a reference display parameter similar to the gamma related display parameter in the database, where the term "similar" refers to that a difference between the reference chroma coordinates of the template and the measured chroma coordinates is smaller than a certain predetermined value, and a difference between the reference luminance coordinates of the template and the measured luminance coordinates is also smaller than a certain predetermined value. For example, a difference $\Delta u'$ of the chroma coordinates u' is smaller than 0.002, a difference $\Delta v'$ of the chroma coordinates v' is smaller than 0.002, and a difference $\Delta Lv$ of the luminance coordinates Lv is smaller than 3%. The aforementioned predetermined values used for comparing the differences of the chroma coordinates and the luminance coordinates can be adjusted by different panel manufactures according to different fabrication processes, and are not limited to the aforementioned values. It should be noticed that if the processing unit 364 finds a plurality of the templates with the difference of the chroma coordinates and the difference of the luminance coordinates all smaller than the predetermined values from the database, an optimal template is further selected. In the present embodiment, the term "optimal" refers to that a distance between the chroma coordinates (i.e. $\Delta u'v' = \sqrt{(\Delta u')^2 + (\Delta v')^2}$) is the minimum, where $\Delta u'$ is the difference of the chroma coordinates u', and $\Delta v'$ is the difference of the chroma coordinates v'.

Figure 1:
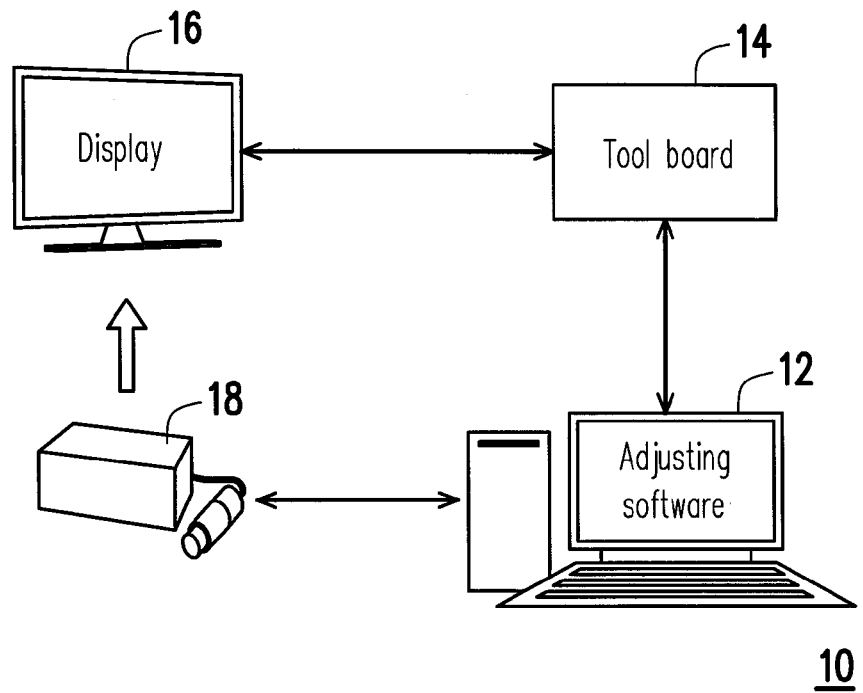
FIG. 1 is a conventional adjusting structure of display parameters.
Figure 2:
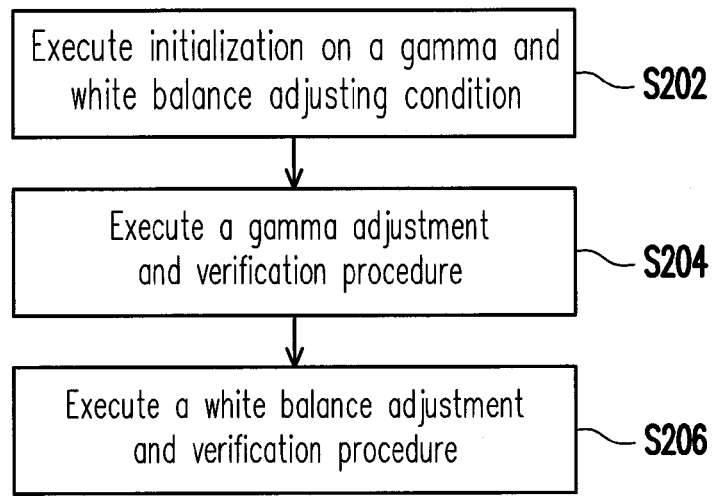
FIG. 2 is a conventional adjustment procedure of display parameters.

If the processing unit 364 searches a similar template from the database, the processing unit 364 obtains the target parameter adjusting data of the template from the database, and sets the target parameter adjusting data to the display 32 through the adjusting device 38, so as to adjust the display 32 (step S506). Conversely, if the processing unit 364 cannot find the similar template from the database, the processing unit 364 controls the adjusting device 38 and the measuring device 34 to execute a standard parameter adjusting procedure to the display 32 (step S510), and such adjusting procedure is the procedure mentioned in FIG. 1 and FIG. 2 of the related art, and details thereof are not repeated. Different from the related art, after executing the standard parameter adjusting procedure, the processing unit 364 of the present embodiment further creates the template corresponding to the display 32 in the database, and records the real display parameters measured by the measuring device 34 and the target parameter adjusting data obtained by executing the standard parameter adjusting procedure in the created template (step S512), so as to facilitate learning data used for adjusting the display parameters of the display 32, and serving as a basis for adjusting display parameters of the similar displays.

In step S506, after adjusting the display parameters of the display 32, the processing unit 364 can further control the measuring device 34 to measure the gamma related display parameter of the adjusted display 32, so as to determine whether the measured display parameter is in accordance with the predetermined specification (step S508). The predetermined specification is, for example, a specification requirement of the display 32 specified by the customer. That is, for example, a value range set for the chroma coordinates. For example, when the chroma coordinate u' measured by the measuring device 34 is between a predetermined range from 0.1874 to 0.1894, the chroma coordinate v' is between a predetermined range from 0.4275 to 0.4295, and the difference of the luminance coordinates Lv is smaller than 3%, it is confirmed that the display parameter of the adjusted display 32 is in accordance with the predetermined specifications. Similarly, the specifications of the chroma coordinates and the luminance coordinates are also different according to different customer and product requirements, which are not limited by the invention.

In step S508, if the processing unit 364 determines that the real display parameter measured by the measuring device 34 is in accordance with the predetermined specification, the adjustment is unnecessary to be made, and the flow of display parameter adjustment of the present embodiment is ended. Conversely, if the processing unit 364 determines that the real display parameter measured by the measuring device 34 is not in accordance with the predetermined specification, the processing unit 364 controls the adjusting device 38 and the measuring device 34 to execute the standard parameter adjusting procedure to the display 32 (step S510). After executing the standard parameter adjusting procedure, the processing unit 364 further creates the template corresponding to the display 32 in the database, and records the real display parameters measured by the measuring device 34 and the target parameter adjusting data obtained by executing the standard parameter adjusting procedure in the created template (step S512), so as to facilitate learning data used for adjusting the display parameters of the display 32, and serving as a basis for adjusting display parameters of the similar displays.

According to the aforementioned adjusting method, the display parameter adjusting system can directly apply the reference parameter adjusting data obtained by executing the gamma adjustment to the display with similar panel characteristics, so as to shorten the time required for adjusting the display parameters.

Figure 6:
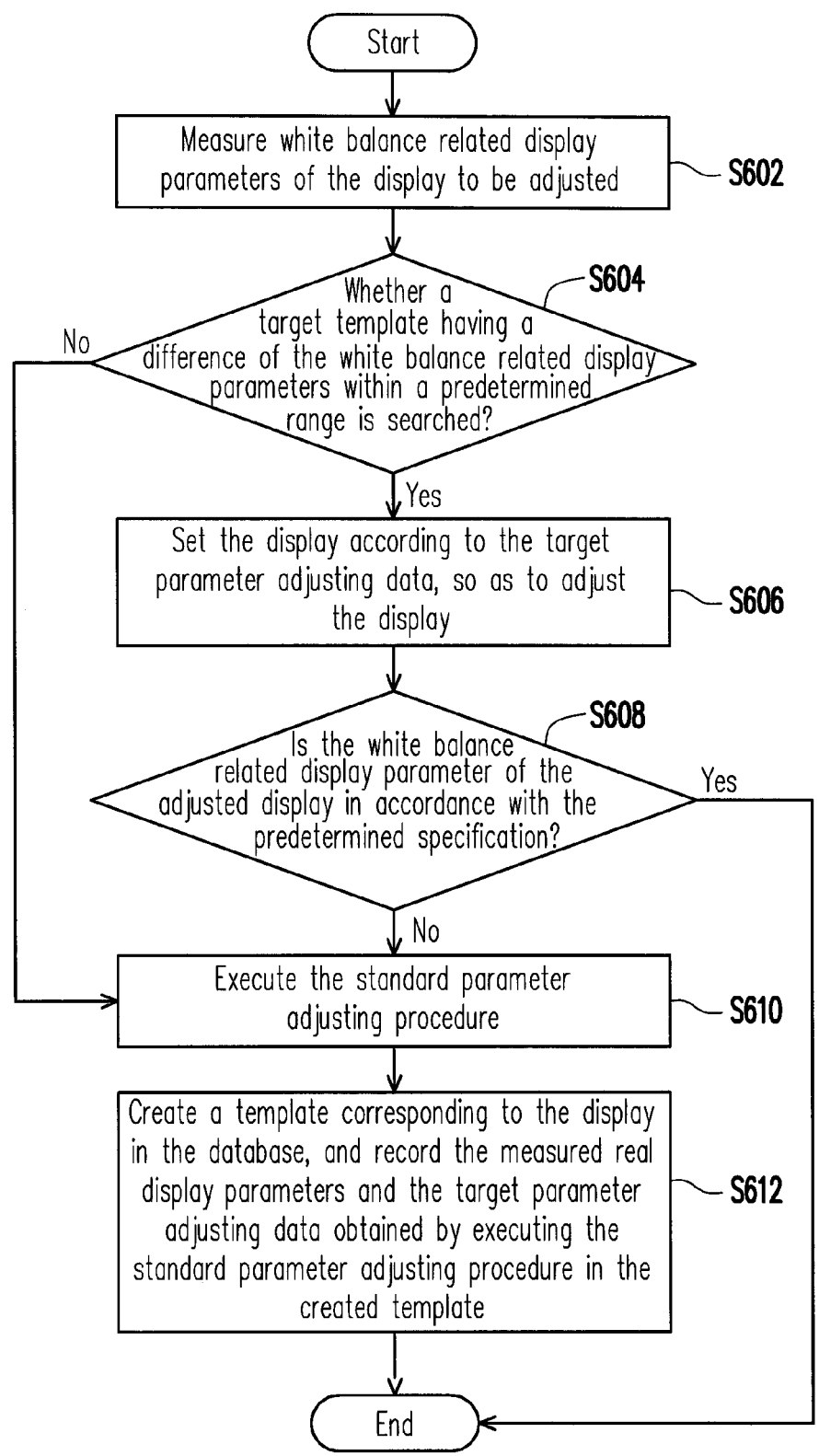
FIG. 6 is a flowchart illustrating a learning type white balance adjusting method according to an embodiment of the invention.

Regarding adjustment of the white balance, FIG. 6 is a flowchart illustrating a learning type white balance adjusting method according to an embodiment of the invention. Referring to FIG. 3 and FIG. 6, the method of the embodiment is, for example, used to further adjust the white balance of the display 32 after the gamma adjustment flow of FIG. 5. Detailed steps of the gamma adjusting method of the invention are described below with reference to various components of the display parameter adjusting system 30.

First, the measuring device 34 measures a white balance related display parameter of the display 32 (step S602). The measured display parameter is, for example, chroma coordinates of the display 32 measured under a high value mode and a low value mode of the white balance setting, which is not limited by the invention.

Then, the processing unit 364 of the processing device 36 searches a target template from a plurality of templates in the database, where a difference between a reference display parameter of the target template and the white balance related display parameter is within a predetermined range (step S604). Regarding a method of searching the target template, in the present embodiment, a difference between the measured white balance related display parameter and a reference white balance related display parameter recorded in each template is calculated, and it is determined whether the difference is within a certain predetermined range or ratio, so as to find the proper template.

In the present embodiment, the processing unit 364, for example, first searches the template with a reference display parameter similar to the white balance related display parameter in the database, where the term "similar" refers to that a difference between the chroma coordinates of the template and the measured chroma coordinates is smaller than a certain predetermined value. For example, under the high value mode, a difference $\Delta u_h'$ of the chroma coordinates u' is smaller than 0.002, and a difference $\Delta v_h'$ of the chroma coordinates v' is smaller than 0.002; and under the low value mode, a difference $\Delta u_l'$ of the chroma coordinates u' is smaller than 0.002, and a difference $\Delta v_l'$ of the chroma coordinates v' is smaller than 0.002. The aforementioned predetermined values used for comparing the differences of the chroma coordinates can be adjusted by different panel manufactures according to different fabrication processes, and are not limited to the aforementioned values. It should be noticed that if the processing unit 364 finds a plurality of the templates with the difference of the chroma coordinates all smaller than the predetermined values from the database, an optimal template is further selected. In the present embodiment, the term "optimal" refers to that a sum of differences (i.e. $\Delta u'v'\_h$ and $\Delta u'v'\_l$) between the chroma coordinates under the high and low value modes is the minimum, where $\Delta u'v'\_h = \sqrt{(\Delta u\_h')^2 + (\Delta v\_h')^2}$, $\Delta u\_h'$ is the difference of the chroma coordinates u' under the high value mode, and $\Delta v\_h'$ is the difference of the chroma coordinates v' under the high value mode; $\Delta u'v'\_l = \sqrt{(\Delta u\_l')^2 + (\Delta v\_l')^2}$, $\Delta u\_l'$ is the difference of the chroma coordinates u' under the low value mode, and $\Delta v\_l'$ is the difference of the chroma coordinates v' under the low value mode.

If the processing unit 364 searches a similar template from the database, the processing unit 364 obtains the target parameter adjusting data of the template from the database, and sets the target parameter adjusting data to the display 32 through the adjusting device 38, so as to adjust the display 32 (step S606). Conversely, if the processing unit 364 cannot find the similar template from the database, the processing unit 364 controls the adjusting device 38 and the measuring device 34 to execute the standard parameter adjusting procedure to the display 32 (step S610). After executing the standard parameter adjusting procedure, the processing unit 364 of the present embodiment further creates the template corresponding to the display 32 in the database, and records the real display parameters measured by the measuring device 34 and the target parameter adjusting data obtained by executing the standard parameter adjusting procedure in the created template (step S612), so as to facilitate learning data used for adjusting the display parameters of the display 32, and serving as a basis for adjusting display parameters of the similar displays.

In step S606, after adjusting the display parameters of the display 32, the processing unit 364 can further control the measuring device 34 to measure the white balance related display parameter of the adjusted display 32, so as to determine whether the measured display parameter is in accordance with the predetermined specification (step S608). The predetermined specification is, for example, a specification requirement of the display 32 specified by the customer. That is, for example, a value range set for the chroma coordinates under the high and low value modes. For example, when the chroma coordinate u_h' measured by the measuring device 34 under the high value mode is between a predetermined range from 0.1901 to 0.1921, and the chroma coordinate v_h' is between a predetermined range from 0.4351 to 0.4391, and when the chroma coordinate u_l' measured by the measuring device 34 under the low value mode is between a predetermined range from 0.1891 to 0.1931, and the chroma coordinate v_l' is between a predetermined range from 0.4345 to 0.4405, it is confirmed that the display parameter of the adjusted display 32 is in accordance with the predetermined specifications. Similarly, the specifications of the chroma coordinates and the luminance coordinates are also different according to different customer and product requirements, which are not limited by the invention.

In the step S608, if the processing unit 364 determines that the display parameter measured by the measuring device 34 is in accordance with the predetermined specification, the adjustment is unnecessary to be made, and the flow of display parameter adjustment of the present embodiment is ended. Conversely, if the processing unit 364 determines that the display parameter measured by the measuring device 34 is not in accordance with the predetermined specification, the processing unit 364 controls the adjusting device 38 and the measuring device 34 to execute the standard parameter adjusting procedure to the display 32 (step S610). After executing the standard parameter adjusting procedure, the processing unit 364 further creates the template corresponding to the display 32 in the database, and records the real display parameters measured by the measuring device 34 and the target parameter adjusting data obtained by executing the standard parameter adjusting procedure in the created template (step S612), so as to facilitate learning data used for adjusting the display parameters of the display 32, and serving as a basis for adjusting display parameters of the similar displays.

According to the aforementioned adjusting method, the display parameter adjusting system can directly apply the target parameter adjusting data obtained by executing the white balance adjustment to the display with similar panel characteristics, so as to shorten the time required for adjusting the display parameters.

In summary, in the method and system for adjusting display parameters, by recording the panel characteristic parameters and the corresponding parameter adjusting data of the display in the database, when a display with similar panel characteristic is detected, the parameter adjusting data obtained in previous gamma and/or white balance adjustment is directly searched and used, so as to effectively shorten the time required for adjusting the display parameters to improve adjusting performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for adjusting display parameters, comprising:
measuring at least one real display parameter of a display;
searching a target template in accordance with the at least one real display parameter from a plurality of templates stored in a database, and obtaining target parameter adjusting data recorded in the target template, wherein each template records at least one reference display parameter of a tested display and reference parameter adjusting data used to adjust the tested display; and
setting the display according to the target parameter adjusting data, so as to adjust the display,
wherein the at least one real display parameter comprises chroma, and the step of searching the target template in accordance with the at least one real display parameter from the database comprises:
calculating a chroma difference between the measured chroma and a reference chroma recorded in each of the templates; and
selecting the template with the minimum chroma difference to serve as the target template in accordance with the at least one real display parameter,
wherein the at least one real display parameter comprises luminance, and before the step of selecting the template with the minimum chroma difference to serve as the target template in accordance with the at least one real display parameter, the method further comprises:
calculating a luminance difference between the measured luminance and a reference luminance recorded in each of the templates;
determining whether the chroma difference and the luminance difference are respectively smaller than a first predetermined value and a second predetermined value; and
selecting the template with the minimum chroma difference to serve as the target template in accordance with the at least one real display parameter when the chroma difference and the luminance difference are respectively smaller than the first predetermined value and the second predetermined value.

2. A display parameter adjusting system, comprising:
a display;
a measuring device, configured to measure at least one real display parameter of the display;
a processing device, coupled to the measuring device, and comprising:
a storage unit, configured to store a database containing a plurality of templates, wherein each of the templates records the at least one reference display parameter of a tested display and reference parameter adjusting data used to adjust the tested display; and
a processing unit, configured to search a target template in accordance with the at least one real display parameter measured by the measuring device from the templates in the database, and obtain target parameter adjusting data recorded in the target template; and
an adjusting device, coupled to the display and the processing device, and configured to adjust the display according to the target parameter adjusting data obtained by the processing device, so as to adjust the display,
wherein the at least one real display parameter comprises chroma, and the processing unit calculates a chroma difference between the measured chroma and a reference chroma recorded in each of the templates, and selects the template with the minimum chroma difference to serve as the target template in accordance with the at least one real display parameter,
wherein the at least one real display parameter comprises luminance, and the processing unit further calculates a luminance difference between the measured luminance and a reference luminance recorded in each of the templates, and determines whether the chroma difference and the luminance difference are respectively smaller than a first predetermined value and a second predetermined value, and selects the template with the minimum chroma difference to serve as the target template in accordance with the at least one real display parameter when the chroma difference and the luminance difference are respectively smaller than the first predetermined value and the second predetermined value.

3. The method for adjusting display parameters as claimed in claim 1, wherein the at least one real display parameter comprises chroma under a high value mode and a low value mode, and the step of searching the target template in accordance with the at least one real display parameter from the database comprises:
calculating a first chroma difference between the chroma measured under the high value mode and a reference chroma recorded in each of the templates and a second chroma difference between the chroma measured under the low value mode and the reference chroma recorded in each of the templates; and
selecting the template with the minimum summation of the first chroma difference and the second chroma difference to serve as the target template in accordance with the at least one real display parameter.

4. The method for adjusting display parameters as claimed in claim 3, wherein before the step of selecting the template with the minimum summation of the first chroma difference and the second chroma difference to serve as the target template in accordance with the at least one real display parameter, the method further comprises:
determining whether the first chroma difference under the high value mode and the second chroma difference under the low value mode are respectively smaller than a first predetermined value and a second predetermined value; and selecting the template with the minimum summation of the first chroma difference and the second chroma difference to serve as the target template in accordance with the at least one real display parameter when the first chroma difference and the second chroma difference are respectively smaller than the first predetermined value and the second predetermined value.

5. The method for adjusting display parameters as claimed in claim 1, wherein the step of searching the target template in accordance with the at least one real display parameter from the database to obtain the target parameter adjusting data corresponding to the template comprises:
executing a standard parameter adjusting procedure to the display if the target template in accordance with the at least one real display parameter is not searched out.

6. The method for adjusting display parameters as claimed in claim 5, wherein after the step of executing the standard parameter adjusting procedure to the display, the method further comprises:
creating the template corresponding to the display in the database, and recording the at least one real display parameter and the target parameter adjusting data obtained by executing the standard parameter adjusting procedure in the created template.

7. The method for adjusting display parameters as claimed in claim 1, wherein after the step of adjusting the at least one real display parameter of the display, the method further comprises:
measuring the at least one real display parameter of the adjusted display and determining whether the at least one real display parameter is in accordance with a predetermined specification;
executing a standard parameter adjusting procedure to the display if the at least one real display parameter is not in accordance with the predetermined specification.

8. The method for adjusting display parameters as claimed in claim 7, wherein after the step of executing the standard parameter adjusting procedure to the display, the method further comprises:
creating the template corresponding to the display in the database, and recording the at least one real display parameter and the target parameter adjusting data obtained by executing the standard parameter adjusting procedure in the created template.

9. The method for adjusting display parameters as claimed in claim 7, wherein the step of measuring whether the at least one real display parameter of the adjusted display is in accordance with the predetermined specification so as to execute the standard parameter adjusting procedure to the display comprises:
measuring luminance and chroma of the adjusted display;
determining whether the measured luminance and the measured chroma are respectively in accordance with a first predetermined range and a second predetermined range; and
executing the standard parameter adjusting procedure to the display when the measured luminance is not in accordance with the first predetermined range or the measured chroma is not in accordance with the second predetermined range.

10. The display parameter adjusting system as claimed in claim 2, wherein the at least one real display parameter comprises chroma under a high value mode and a low value mode, and the processing unit calculates a first chroma difference between the chroma measured under the high value mode and a reference chroma recorded in each of the templates and a second chroma difference between the chroma measured under the low value mode and the reference chroma recorded in each of the templates, and selects the template with the minimum summation of the first chroma difference and the second chroma difference to serve as the target template in accordance with the at least one real display parameter.

11. The display parameter adjusting system as claimed in claim 10, wherein the processing unit further determines whether the first chroma difference under the high value mode and the second chroma difference under the low value mode are respectively smaller than a first predetermined value and a second predetermined value, and selects the template with the minimum summation of the first chroma difference and the second chroma difference to serve as the target template in accordance with the at least one real display parameter when the first chroma difference and the second chroma difference are respectively smaller than the first predetermined value and the second predetermined value.

12. The display parameter adjusting system as claimed in claim 2, wherein the processing unit controls the adjusting device and the measuring device to execute a standard parameter adjusting procedure to the display if the target template in accordance with the at least one real display parameter is not searched out.

13. The display parameter adjusting system as claimed in claim 12, wherein after the processing unit executes the standard parameter adjusting procedure to the display, the processing unit creates the template corresponding to the display in the database, and records the at least one real display parameter and the target parameter adjusting data obtained by executing the standard parameter adjusting procedure in the created template.

14. The display parameter adjusting system as claimed in claim 2, wherein after adjusting the at least one real display parameter of the display, the processing unit further controls the measuring device to measure the at least one real display parameter of the adjusted display, and determines whether the at least one real display parameter is in accordance with a predetermined specification, and controls the adjusting device and the measuring device to execute a standard parameter adjusting procedure to the display if the at least one real display parameter is not in accordance with the predetermined specification.

15. The display parameter adjusting system as claimed in claim 14, wherein after executing the standard parameter adjusting procedure to the display, the processing unit further creates the template corresponding to the display in the database, and records the at least one real display parameter and the target parameter adjusting data obtained by executing the standard parameter adjusting procedure in the created template.

16. The display parameter adjusting system as claimed in claim 14, wherein the measuring device measures luminance and chroma of the adjusted display, and the processing unit determines whether the measured luminance and the measured chroma are respectively in accordance with a first predetermined range and a second predetermined range, and executes the standard parameter adjusting procedure to the display when the measured luminance is not in accordance with the first predetermined range or the measured chroma is not in accordance with the second predetermined range.

* * * * *